Jan. 2, 1962   H. G. REICHEL ET AL   3,015,350
BACON SLICER HAVING ADJUSTABLE CONTROL OF GROUP SIZE
Filed Oct. 14, 1957   5 Sheets-Sheet 1

HOWARD. G. REICHEL
STEPHEN. W. LIS
INVENTORS

BY K.B. Story
ATTORNEY

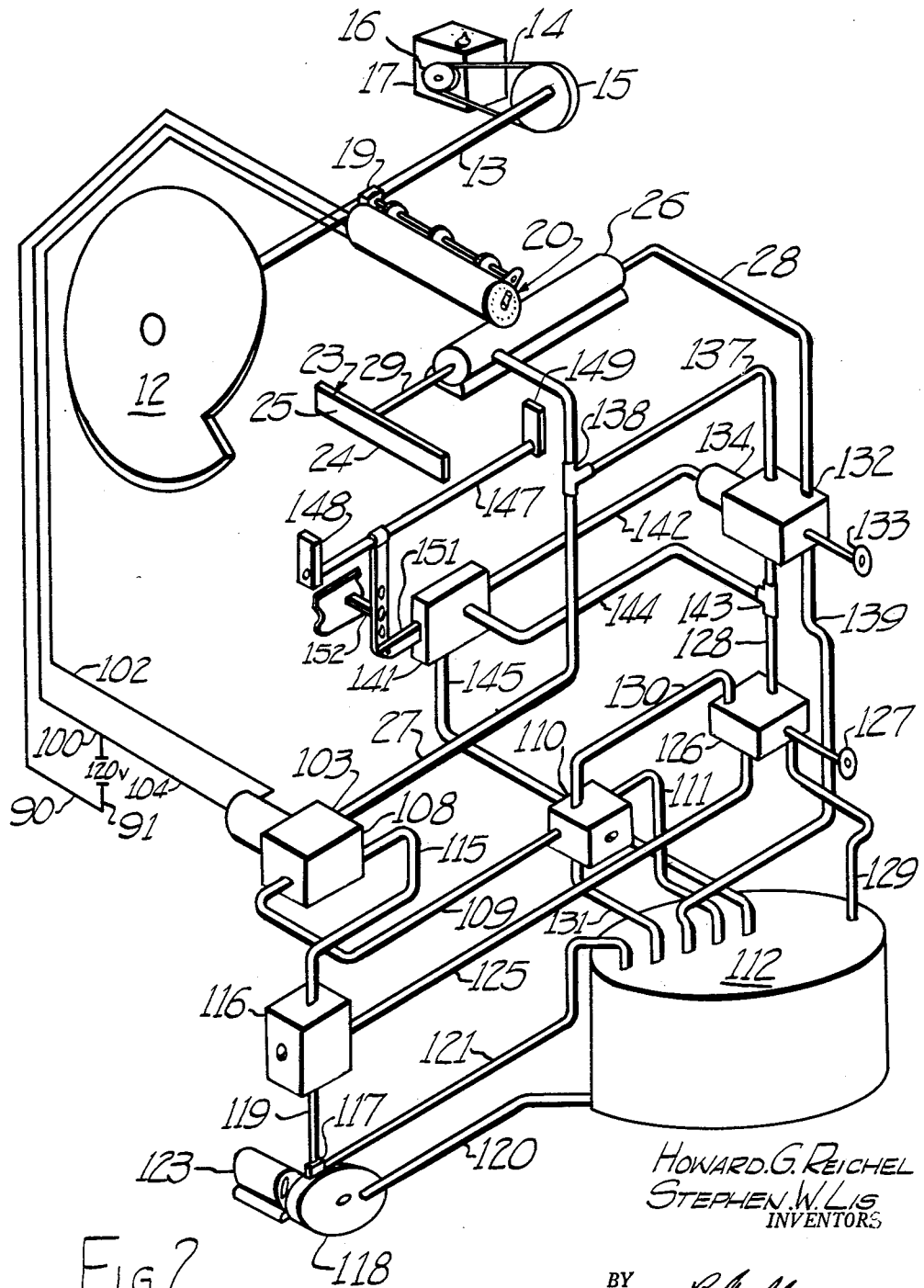

Jan. 2, 1962  H. G. REICHEL ET AL  3,015,350
BACON SLICER HAVING ADJUSTABLE CONTROL OF GROUP SIZE
Filed Oct. 14, 1957  5 Sheets-Sheet 3

HOWARD G. REICHEL
STEPHAN W. LIS
INVENTOR.

BY R.G. Story
ATTORNEY

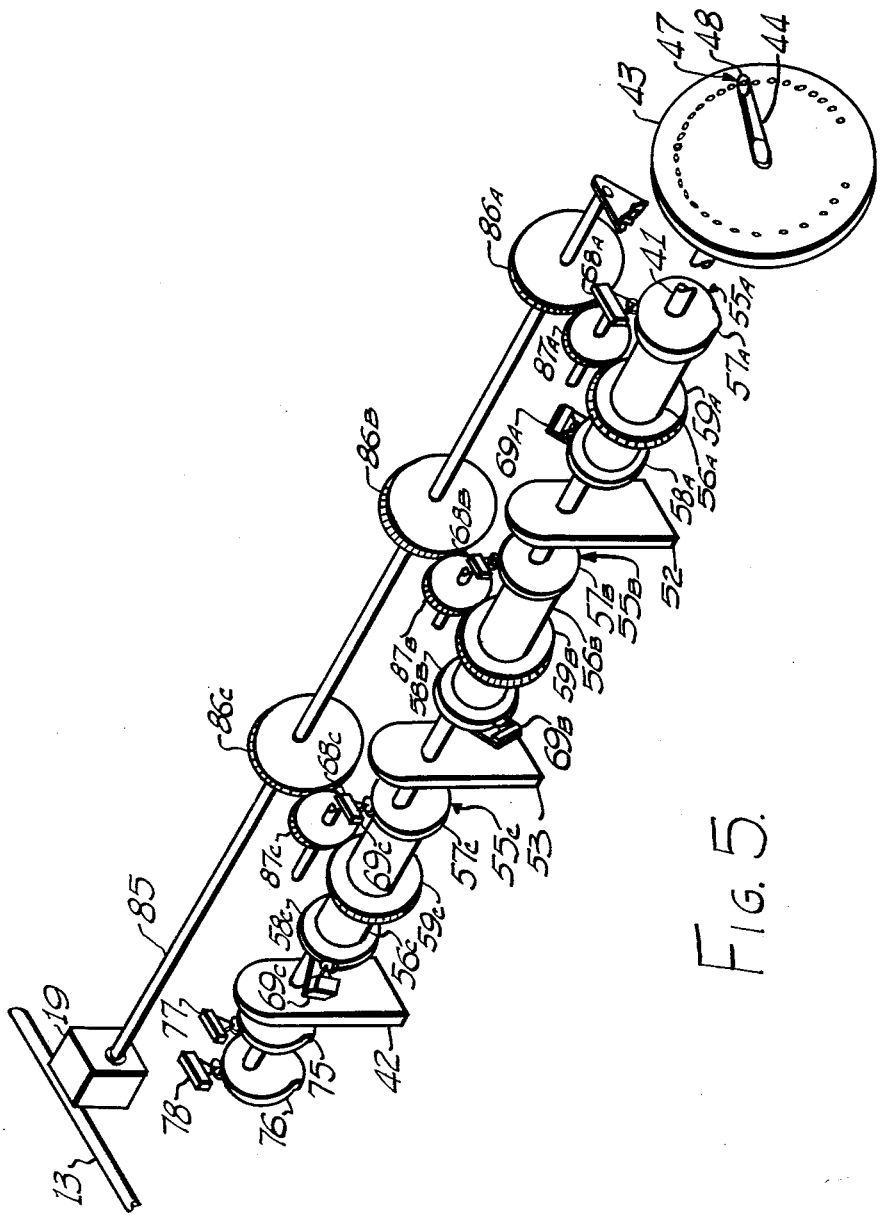

3,015,350
BACON SLICER HAVING ADJUSTABLE CONTROL OF GROUP SIZE
Howard G. Reichel and Stephen W. Lis, Chicago, Ill., assignors to Swift & Company, Chicago, Ill., a corporation of Illinois
Filed Oct. 14, 1957, Ser. No. 689,860
8 Claims. (Cl. 146—94)

This invention relates in general to improvements in slicing machines and is particularly directed to a method and device for automatically separating a selected number of slices into a draft while maintaining at least a minimum established distance between successive drafts.

While the present invention is applicable to numerous types of feed mechanisms it has been found to be particularly suitable for use in a bacon slicing machine. This disclosure illustrates such a use; however, it will be obvious that the improvement may be otherwise employed without departing from the invention.

In general, bacon slicing machines comprise a horizontal bed, a rotatable knife means disposed perpendicular to the bed for slicing material thereon, and a feed carriage movable along the bed at a right angle to the plane of the knife. The feed carriage is usually actuated by a hydraulic piston and cylinder and the rate of advance of the carriage depends upon the amount of fluid introduced into the cylinder to displace the piston. Thus, in prior machines, a flow valve located in the hydraulic line leading to the end of the cylinder opposite the feed carriage has been used to control the rate of feed. Usually, the knife severs one slice each revolution and it clearly follows that the thickness of each slice will be dependent upon the speed of the knife and the rate of feed. Preferably, the knife speed is maintained constant during operation and the slice thickness is controlled by adjusting the rate of feed. An increase in the rate of feed will result in a relative increase in the thickness of the slices and may be obtained by increasing the amount of the fluid introduced into the cylinder. However, prior apparatus have lacked efficient and effective means to separate or otherwise distinguish a selected number of slices to form a draft. Present marketing techniques dictate that the sliced material be grouped into convenient units or drafts for consumer sales. Bacon is normally sold in packages of shingled slices weighing either one-half pound or one full pound. Further, it has been found desirable to keep the slice thickness within certain limits. Theoretically the number of slices of a given thickness making up a half pound or pound unit may be determined from the physical characteristics and dimensions of a bacon slab; however, each slab usually differs somewhat from the others and therefore the weight of individual slices obtained from different slabs may vary. Often this results in a change in the number of slices of the given thickness required to make up a draft of the desired weight. The slices, when severed, fall in shingled fashion onto a continuously moving take-off conveyor. Heretofore slices have been grouped by either momentarily interrupting the advance of the feed carriage or momentarily accelerating the speed of the take-off conveyor. Both of these provisions have had the drawback of being unadaptable to varying conditions. Prior apparatus have lacked any means to selectively control the number of slices per draft and the space between drafts. Further, a momentary interruption has often been insufficient to space the drafts a sufficient distance and has often caused the first and last slices of a draft to differ in thickness from the remaining slices making up the draft.

It is therefore a principal object of this invention to provide a method for automatically grouping bacon slices into drafts of a selected number of slices.

Another object of this invention is to provide a selective means for automatically controlling the number of slices making up a draft.

Another object of this invention is to provide a means in a slicing machine for automatically grouping a draft of a preselected number of slices.

Still another object of the present invention is to provide an automatic and adjustable means in a slicing machine for stopping the feed for at least a minimum interval and advancing the feed for a period sufficient to obtain a selected number of slices whereby the slices will be grouped in a draft of the desired number.

A further object of this invention is to provide an automatic and adjustable means in a slicing machine, having hydraulic means for advancing a feed carriage toward a knife, to interrupt the flow of hydraulic fluid for at least a minimum period and allow the flow of fluid only during an interval sufficient to provide a desired number of slices.

A still further object of this invention is to provide a novel means to control the flow of hydraulic fluid from a hydraulic feed means in a slicing machine and maintain uniform advance of the feed means to obtain slices of a uniform thickness.

Other objects and advantages of the invention will become apparent upon reading the following description taken in conjunction with the accompanying drawings. One embodiment of the invention has been illustrated, but it is to be expressly understood that said drawings are for purposes of illustration only and are not to be taken as a definition of the limits of the invention, reference being had to the appended claims for this purpose. In said drawings:

FIGURE 2 is a diagrammatic view, in perspective, showing the relationship of the working parts of the slicing machine of FIGURE 1, the hydraulic system and the control device;

FIGURE 5 is a perspective view of the control device shown in FIGURE 4 showing the gear reducer;

Figure 3:
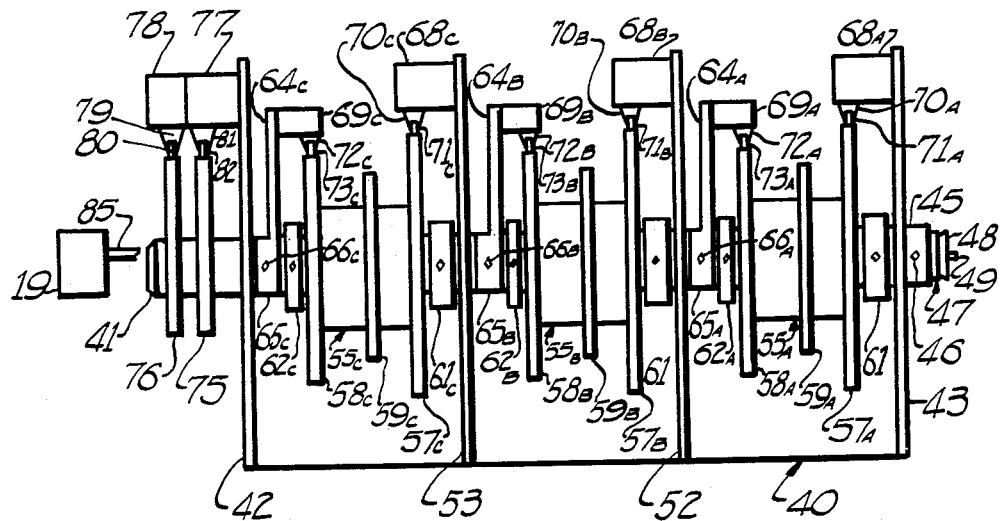
FIGURE 3 is a side elevation view of the control device, as seen from the position of the knife, showing the index shaft, the cam assemblies and electric switches.

Generally the present invention comprises a method for advancing the material to be sliced into the slicing means only during certain periods, interrupting the advance of the material at the end of each period of advancement for an interval of time at least sufficient for the slices, which were severed, to be acted upon so that they may be readily distinguished from succeeding groups of slices; and then again advancing the material into the slicing means. The periods of advancement may be regulated to provide for a selection in the number of slices which may be obtained therein. The apparatus which has been devised for automatically carrying out the method includes a flow control valve placed in the hydraulic line which normally carries hydraulic fluid leaving the hydraulic cylinder. This valve is operated to control the rate of advance of the feed carriage. A valve is located in the same line between the flow control valve and the hydraulic cylinder and is normally in a first position to direct fluid leaving the cylinder to the flow control valve. An actuating means is provided to move the valve to a second position to block the flow of fluid from the cylinder and thereby interrupt the advance of the feed carriage. Concurrently, the flow control valve is connected to a source of fluid under a pressure equal to the pressure of fluid normally leaving the cylinder. This design provides a constant unceasing flow of fluid at an even pressure through the control valve with the result that fluid will not surge from the cylinder when it is reconnected to the flow control valve. Thus, the rate of advance of the feed carriage will be uniform throughout essentially all of each period of advance.

The actuating means to move the valve is connected to a control device comprising a cam means which is rotatable at a fraction of the rate of the knife. Each full rotation of the cam means represents a certain number of revolutions of the knife, and likewise an equal number of possible slices. A first and a second sensing means are associated with and actuated by the cam means. The first sensing means is movable through a plurality of positions about the periphery of the cam means (the distance between successive positions is equal to the distance turned by the cam means for each revolution of the slicing machine knife) and is connected to the valve actuating means to cause the latter to place the valve in its second position, blocking the flow of fluid from the cylinders and stopping the feed carriage, when the first sensing means is actuated by the cam means. The second sensing means is connected to the valve actuating means to cause the latter to move to its first position, allowing fluid to flow from the cylinder and advance the feed carriage, when the second sensing means is actuated by the cam means. Thus, the relative positions of the two sensing means with respect to the cam means will control the duration of the periods that material will be advanced into the slicing machine knife, and likewise the periods that the advance of the material will be interrupted.

Figure 1:
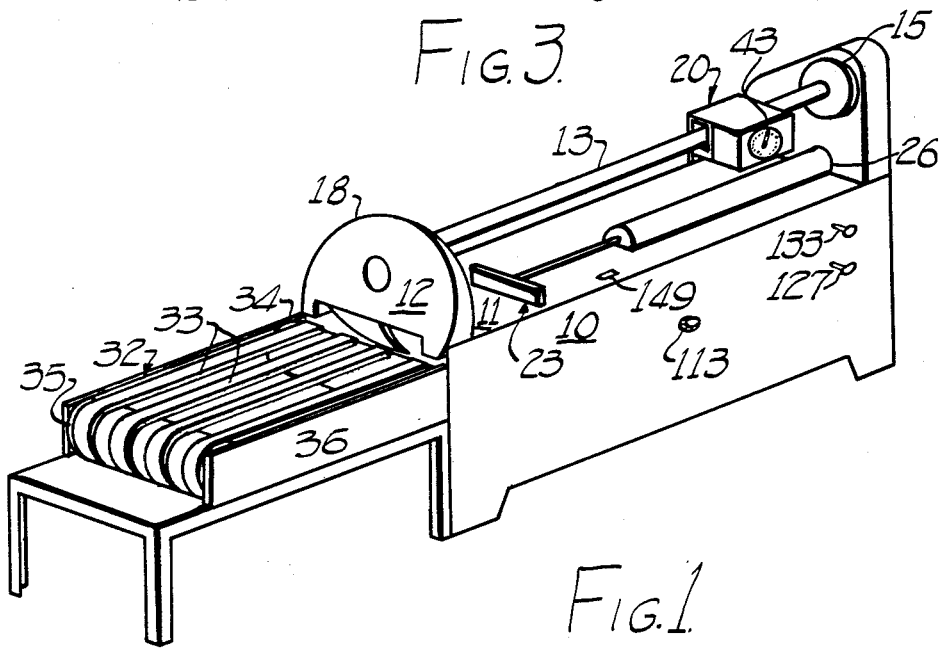
FIGURE 1 is a perspective view of one form of slicing machine embodying the present invention.

The slicing machine illustrated in FIGURES 1 and 2 comprises a bed 10 having a flat upper surface 11 upon which a bacon slab may be moved toward a knife 12. Knife 12 is secured to a rotatable shaft 13 which is driven by means of a belt 14 connecting a pulley 15, secured to the shaft 13, to another pulley 16 on a motor 17. For purposes of safety, knife 12 is substantially enclosed in a guard 18. A precision gear reducer 19 having a ratio of 80 to 1 is connected to the knife shaft 13 by means of a gear thereon (not shown). A control device generally 20 is connected to the low speed side of the gear reducer 19 in a manner which will be later described. Slidably disposed on the upper surface 11 of bed 10 is a material feed carriage generally 23. This feed carriage consists of a pusher member 24 having a pusher face 25 suitable for engaging the end of the material to be sliced. Located at the end of bed 10, opposite the knife 12, is a hydraulic cylinder 26. The forward end of the cylinder (nearer knife 12) and the rear end of the cylinder are connected to fluid lines 27 and 28 respectively. A piston (not shown) is attached to a rod 29 extending from the forward end of cylinder 26. Piston rod 29 is connected to the pusher member 24 and will urge it, and any material forward thereof, toward knife 12 when fluid under pressure is introduced through fluid line 28 to the rear of cylinder 26.

The slicing machine also includes a take-off conveyor generally 32 consisting of a plurality of ribbons 33 trained about a pair of drums 34, 35 which are rotatably secured to a suitable stand 36. The take-off conveyor 32 may be driven in any convenient fashion, such as by means of a separate electric motor, or by suitable connection to motor 17 or to knife shaft 13.

Figure 4:
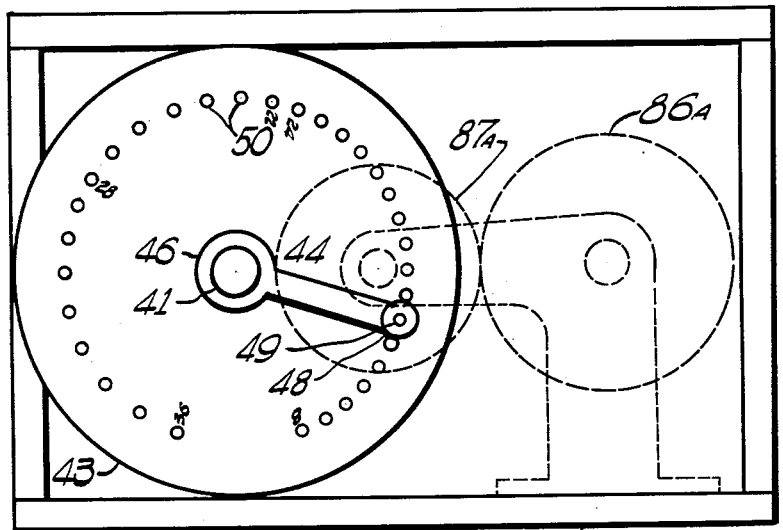
FIGURE 4 is a front elevation of the control device of FIGURE 3 showing the index plate and the index shaft handle.

The components of the control device generally 20 are situated in a frame 40 which is secured to the slicing machine above bed 10 proximate to the knife shaft 13. As seen in FIGURES 3 and 5, an index shaft 41 is rotatably supported between a vertical frame member 42 near one end of the frame 40, and an index plate 43 at the opposite end of frame 40. A crank arm 44 is fastened to the end of the index shaft 41 extending from the face of the index plate 43. As illustrated in FIGURE 4, the crank arm 44 is attached to the index shaft 41 by means of a collar 45 formed, in one end of the crank arm 44, concentric about the index shaft 41, and a set screw 46 threaded therein. At the end of the crank arm 44 opposite collar 45 is a handle generally 47. A knurled knob 48 having a threaded internal passage therein is rotatably secured to the handle 47. Disposed within the threaded passage of knob 48 is a threaded locking pin 49, which will be advanced toward the index plate 43 when knob 48 is turned in a clock-wise direction. In like manner, the locking pin 49 will be withdrawn when the knob is turned in a counter clock-wise direction. A plurality of pin seats 50 are located across the face of index plate 43 to receive the locking pin 49 and thereby secure the crank arm 44 and index shaft 41 in any selected position.

As will become clear in the following description the control device 20 contains three separate operating channels comprising similar elements. These channels have been designated by the letters A, B, and C and reference characters denoting similar elements in the various channels bear the appropriate letter as a subscript. Each channel provides a means for selecting a certain range of number of slices per draft. The position of the index shaft 41, as determined by the pin seat 50 in which locking pin 49 is secured, controls both the selection of the appropriate channel and the selection of the number of slices to be obtained thereby. In the embodiment described channel A controls the operation of the feed carriage 23 for from eight to twenty-four slices per draft; and channels B and C control its operations for from twenty-two to twenty-eight and from twenty-nine to thirty-six slices per draft respectively. It may be seen that since twenty-two to twenty-four slices per draft may be obtained by employing either channel A or B these numbers appear twice on the index plate 43. Also, the amount that index shaft 41 must be rotated for each increment of increase in the number of slices selected varies somewhat for each of the three channels. Thus, the distance between pin seats 50 is different in so far as the different channels are compared.

Referring to FIGURES 3 and 5, a pair of vertical frame members 52 and 53 are located between the index plate 43 and the frame member 42 in a manner which physically separates the elements of the three channels A, B, and C. The index shaft 41 extends through the vertical frame members 42, 52, and 53 and is journaled therein. Only the parts forming channel A will be described in detail since the description will also apply to channels B and C.

As may be seen in FIGURE 5, a cam assembly generally 55a is situated on the index shaft 41 between the index plate 43 and the vertical frame member 52. Cam assembly 55a comprises a sleeve 56a, having an inner diameter slightly greater than the outer diameter of index shaft 41, and freely rotatable thereon. Adjustably secured to the ends of the sleeve 56a are a pair of cams 57a and 58a. Each of the cams have a generally circular profile with a single projection covering only a small portion of its circumference. A gear 59a is fixed concentrically to the sleeve 56a between cams 57a and 58a. For purposes which will later become clear, gear 59a has forty-five teeth, while gears 59b and 59c have fifty-one and forty-two teeth respectively. As illustrated in FIGURE 3, cam assembly 55a is spaced from the index plate 43 by a spacer bearing 61 which is secured to the index shaft 41 by means of a set screw. A similar spacer bearing 62a is secured to the index shaft 41 adjacent the opposite end of the cam assembly 55a to prevent displacement of the cam assembly in the direction of the frame member 52.

Immediately adjacent the spacer bearing 62a opposite the cam assembly 55a is an arm 64a. Arm 64a extends radially from the index shaft 41 and is attached thereto by means of collar 65a and set screw 66a. An electric switch 68a is secured to the frame 45 at the rear side of index plate 43. (Similar switches 68b and 68c are fixed to vertical frame members 52 and 53 respectively.) Another electric switch 69a is secured to arm 64a and is movable therewith. As illustrated, the switches 68a and 69a are bolted to their supports and are situated radially in line with cams 57a and 58a respectively. Switch 68a is provided with a trip lever 70a having a roller follower 71a. Switch 69a likewise has a trip lever 72a and roller follower 73a. Roller followers 71a and 73a ride on the cams 57a and 58a, respectively, whereby switches 68a and 69a will be actuated briefly by the projections thereon. In the preferred embodiment, switch 68a (and switches 68b and 68c) is a single pole single throw type spring loaded to the closed position. Switch 69a (and switches 69b and 69c) is a single pole single throw type switch spring loaded to the open position.

As may be seen in FIGURES 3 and 5, a pair of switching cams 75, 76 are fixed to the left end of index shaft 41 to rotate therewith. Cam 75 has a raised peripheral portion extending about its circumference a distance representing the angle through which index shaft 41 may be turned when selecting a number of slices per draft on channel A. Similarly, cam 76 has a raised periphery representing the angle turned by the index shaft 41 when selecting drafts on channel B. A pair of single pole, double throw, spring loaded electric switches 77, 78 are secured to vertical frame member 42 directly above the cams 75, 76 respectively. Switch 78 includes a trip lever 79 and a roller follower 80, thereon, which rides on the peripheral surface of cam 76. Also, switch 77 includes a trip lever 81 and a roller follower 82 which rides on cam 75. The switches 77, 78 and cams 75, 76 are situated about index shaft 41 so that when the shaft 41 is in any position representing channel A the raised portion of cam 75 holds switch 77 in its first position, and cam 76 allows switch 78 to dwell in its first position. When shaft 41 is in any position representing channel B cam 75 allows switch 77 to dwell in its second position, and the raised portion of cam 76 holds switch 78 in its second position. When the index shaft 41 is in a position representing channel C, switch 77 dwells in its second position and switch 78 dwells in its first position.

It was indicated that the control device generally 20 is driven from the gear reducer 19. For this purpose a drive shaft 85 (seen in FIGURE 5) is journaled in frame 40 so that it is spaced from and parallel to the index shaft 41. One end of the drive shaft 85 is coupled to the low speed end of gear reducer 19. Three drive gears 86a, 86b, and 86c are fixed to the shaft 85 at positions directly opposite gears 59a, 59b, and 59c (on cam assemblies 55a, 55b, and 55c) respectively. Gears 86a and 86b have one hundred twenty teeth and gear 86c has eighty teeth. Three idler gears 87a, 87b, and 87c are positioned between the opposing gears 59 and 86 on the cam assemblies 55 and the drive shaft 85 respectively. The number of the teeth on the idler gears 87 is not important so long as the connected gears properly mesh.

A drive train may be traced for each cam assembly 55 to determine the number of revolutions of the knife shaft 13 which is necessary to turn the cam assembly 55 one complete revolution. It follows that a simple equation may be developed for such a determination. Where "X" is the number of revolutions of knife shaft 13, $N_1$ is the number of teeth on gear 59 and $N_2$ is the number of teeth on gear 86: $X = N_1/N_2$ (since 80:1 is the ratio of gear reducer 19). Therefore, considering channel A (cam assembly 55a): $X_a = 80(45)/120 = 30$. In other words, cam assembly 55a rotates once for every thirty revolutions of knife 12. Similarly, it may be seen that thirty-four revolutions of knife 12 are required for each full revolution of cam assembly 55b; and forty-two revolutions of knife 12 are required for each revolution of cam assembly 55c. In practice it was determined that if feed carriage 23 was stopped during a minimum of six revolutions of knife 12, a sufficient space would be obtained between successive drafts. Therefore, the practical maximum limit of the number of slices to be controlled by each of the channels A, B, and C is six less than the number of revolutions of knife 12 representing one complete revolution of cam assemblies 55a, 55b, and 55c respectively. As previously indicated, these maximum practical limits are, therefore, twenty-four, twenty-eight, and thirty-six slices respectively. Furthermore, as a practical matter, drafts of less than eight slices are seldom, if ever, required; therefore, eight slices was established as the lower working limit of channel A. It should be obvious from the foregoing description that when the index shaft 41 is positioned to obtain drafts of a selected number of slices, the space between successive drafts will be dependent upon the quantity $X - S$ (where S is the number of slices). For example, if eight slices per draft are required, the distance between drafts will be dependent upon:

$$X_a - S = 30 - 8 = 22$$

or, twenty-two revolutions of knife 12 (the actual distance between drafts will equal the distance take-off conveyor 32 travels while knife 12 revolves twenty-two times). Also, it was found to be of advantage to provide for obtaining twenty-two to twenty-four slices on both channels A and B. In this way, the operator is provided with a means to obtain greater distance between drafts of that number of slices with only a slight sacrifice in efficiency of operation.

Figure 6:
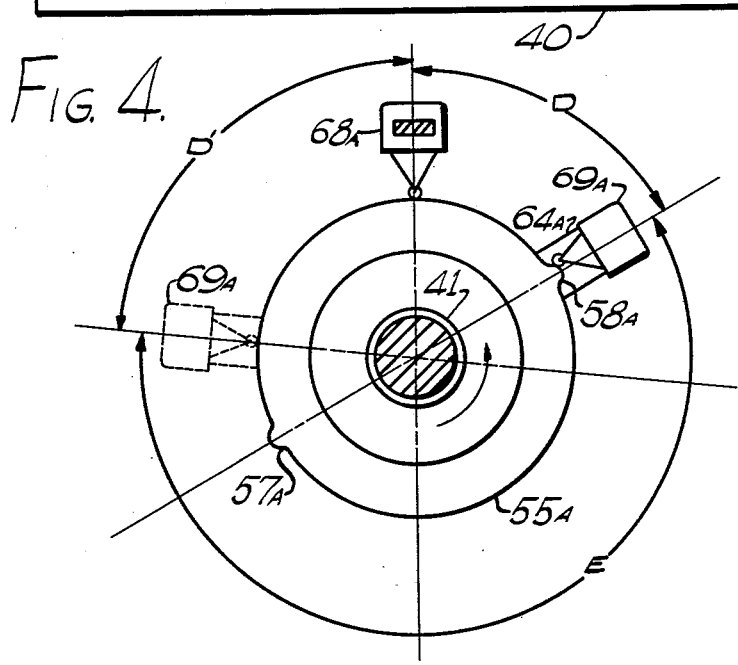
FIGURE 6 is a partial section view taken at line 6—6 of FIGURE 3 showing the relative positions of the cam projections and switches in one channel of the control device.

It is preferred to have the advance of feed carriage 23 commence with the actuation of a switch 68 by the projection on cam 57. Also, the advance is to be stopped when a switch 69 (which is adjustable by moving index shaft 41) is actuated by the projection on cam 58. Therefore, it is necessary that from the instant switch 69 is actuated until the instant that switch 68 is actuated, the cam assembly should turn only an amount representing $X - S$ revolutions of knife 12. The angular displacement between the projections on cams 57 and 58, and between the switches 68 and 69 are interdependent. FIGURE 6 graphically illustrates this relationship and indicates the method by which the initial positions of the cams and switches about the index shaft 41 may be determined. Referring to FIGURE 6, the relationship may be expressed as:

$$E = X - S - D$$

Where E is the angle between a plane containing the axis of index shaft 41 and a line connecting that axis and the point on the projection of cam 58 where switch 69 will be actuated, and a plane containing the axis of index shaft 41 and a line connecting that axis and the point on the projection of cam 57 where switch 68 will be actuated (measured in units of revolutions of knife 12);

X is the number of revolutions of knife 12 representing one revolution of the cam assembly 55;

S is the number of slices per draft selected; and

D is the angle between the center lines of switches 68 and 69, when the index shaft has been positioned for S number of slices per draft, measured in units of revolutions of knife 12 (D is a positive value when measured clockwise from switch 68 and a negative value when measured counter-clockwise from switch 68).

To illustrate, assume that the control device 20 has been set up for drafts of eight slices (S=8) and the angular distance between cams 58a and 57a is 180°. (Since for channel A, X=30, it may be seen that increments of 12° equal the angle cam assembly 55a turns for each revolution of knife 12; therefore, $E=15$.) By transposing the formula and substituting to find D:

$$D=X-S-E$$
$$D=30-8-15$$
$$D=7$$

Since D is a positive value, arm 64a must be positioned on index shaft 41 so that switch 69a is positioned seven increments (84°) clockwise from switch 68a. Thus, after switch 69a is actuated to stop the advance of the feed carriage 23, cam assembly 55a will turn D and E increments (or 22 revolutions of knife 12) before switch 68a will be actuated to start the advance of the feed carriage and produce the next draft of eight slices. Further the angular displacement between successive pin seats 50, indicating the number of slices available on any channel, must be equal to the increment of revolution of the appropriate cam assembly 55 representing one revolution of knife 12. In FIGURE 6, $D^1$ is the angle between switches 68a and 69a when the index shaft 41 has been reset for, say, twenty-two slices. Obviously, the shaft 41 will have been turned through fourteen increments counter-clockwise from the eight slices position. Therefore, switch 69a will be seven increments counter-clockwise from switch 68a. It follows that $D_1=-7$ and the equation may be checked by substituting values:

$$D=X-S-E$$
$$-7=30-22-15$$
$$0=0$$

The electrical circuit

Figure 7:
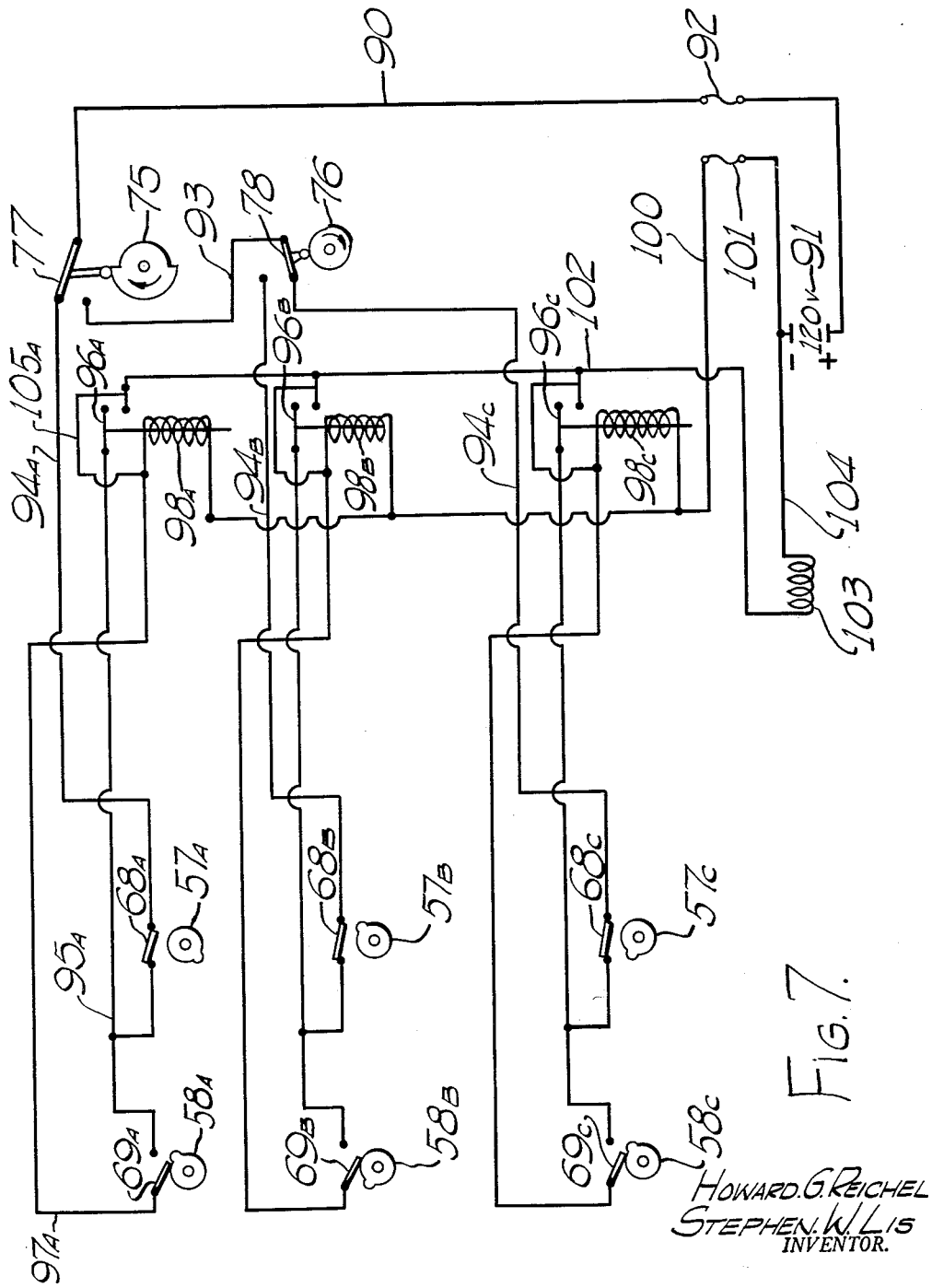
FIGURE 7 is a schematic wiring diagram of the control circuit connecting the valve solenoid and the control device.

Referring to the wiring diagram of FIGURE 7, wire 90 connects switch 77 with the positive pole of a source of electric power 91. A fuse 92 is placed along wire 90. The second position contact of switch 77 is connected to switch 78 by a wire 93. The first position contact of switch 77 is connected to the switch 68a by a wire 94a. Wires 94b and 94c connect the second position and first position contacts, respectively, of switch 78 to switches 68b and 68c respectively. Since the electric circuits for channels B and C are similar to that for channel A, only the latter will be described in detail. The pole of switch 68a is connected by means of wire 95a to a switch 69a and to the blade terminal of a single pole relay switch 96a. Another wire 97a is connected between switch 69a and the upper lead of a solenoid 98a. The lower lead of solenoid 98a is connected to a common wire 100 which is connected, through a fuse 101, to the negative pole of the source of electric power 91. (The lower leads of solenoids 98b and 98c are also connected, in parallel, to wire 100.) Another wire 102 is connected between the fixed contact points of relay switches 96a, 96b, and 96c, and one terminal of a valve actuating solenoid 103. The remaining terminal of valve solenoid 103 is connected to the negative pole of the source of electric power 91 by a wire 104. Also, a wire 105a is connected between the upper lead of solenoid 98a and the stationary contact of relay switch 96a.

Thus, the path of electric current may be traced where the control device 20 is set for, say, eight slices per draft. As may be followed in FIGURE 7, electric current will flow along wire 90 from the source 91 to switch 77. Where eight slices have been selected, cam 75 holds switch 77 to direct current to channel A by way of wire 94a to switch 68a. Switch 68a is normally closed and is only momentarily opened by the cam 57a once each revolution of cam assembly 55a. From switch 68a electric current is directed to both the relay switch 96a and the switch 69a (which is normally open) along wire 95a. When closed, switch 69a passes current along wire 97a to the solenoid 98a which is connected directly to a return wire 100 to the source of electric power 91. Relay switch 96a will be closed when the solenoid 98a is so energized and current will pass from switch 68a along wire 95a through relay switch 96a to wire 102 and the valve solenoid 103. As will be later made clear, energization of the valve solenoid 103 will stop the feed carriage 23. This occurs when switch 69a is momentarily closed by cam 58a. Since switch 69a is immediately opened again the solenoid 98a would normally be de-energized and relay switch 96a would spring open to break the circuit to valve solenoid 103. However, wire 105a will carry current from the fixed contact of relay switch 96a back to the solenoid 98a when the relay is closed. Therefore, once the relay switch 96a is closed, current will flow from switch 68a directly to the solenoid 98a, and the opening of switch 69a will not break the connection so long as switch 68a remains closed. Next, cam 57a momentarily opens switch 68a to begin a new feed sequence. When the switch 68a is opened, current cannot pass to either the relay switch 96a or to switch 69a. Thus, solenoid 98a will be de-energized and will not again close relay switch 96a until both switch 69a and 68a are in a closed position at the same instant. When relay switch 96a is opened current will not pass through valve solenoid 103 and the feed carriage will advance toward knife 12.

As may be seen in FIGURE 7, when the index shaft 41 is turned to a position for drafts of a number of slices controlled by either channel B or C cam 75 will allow switch 77 to dwell in its second position which places wire 93 to switch 78, in communication with the electric power source 91, and disconnects wire 94a (to channel A). The position of index shaft 41 also controls cam 76 which moves switch 78 to place wire 94b (channel B) or wire 94c (channel C) in electrical communication with wire 93. Thus, the appropriate channel circuit will be placed between the source of electric power 91 and the valve solenoid 103 when the index shaft is positioned by turning crank arm 44 and securing the locking pin 49 in any of the pin seats 50. Preferably, the index shaft 41 is formed with a hollow center and the wires to the switches 69a, 69b, 69c, on arms 64a, 64b, and 64c, respectively, are placed therein. Wires to switches 68a, 68b, and 68c, and switches 77, 78 are attached to the frame 40 of the control device 20.

The hydraulic circuit

Referring to FIGURE 2, the valve solenoid 103 is connected to a four-way valve 108 which has two operating positions. Normally, valve 108 is spring loaded to a first position when solenoid 103 is not energized. When the solenoid 103 is energized valve 108 will be forced to a second position. Fluid line 27 is connected to one port of the four-way valve 108. A fluid line 109 is connected between a second port in four-way valve 108 and a flow control valve 110. The flow control valve 110 maintains fluid line 109 in communication with a fluid line 111, attached thereto, which empties into a reservoir or sump 112. Flow control valve 110 is adjustable manually to vary the rate at which fluid may pass from line 109 to the sump 112 by means of a dial 113 (shown in FIGURE 1). When the feed carriage is advancing hydraulic fluid will be forced from the forward end of cylinder 26 through line 27 and the valve 108 (in its first position) to line 109. Thence, the fluid passes through flow control valve 110 (by means of which the rate of advance of the feed carriage 23 is regulated) to the sump 112 by way of line 111.

Another fluid line 115 is attached to a third port on the four-way valve 108 connecting it to a pressure reducing valve 116. The pressure reducing valve 116 in turn is connected to a pressure regulator 117 of a centrifugal pump 118 by fluid line 119. A fluid line 120 carries hydraulic fluid from the sump 112 to the inlet port of pump 118, and a line 121 discharges fluid from the pressure regulator 117 back to the sump 112. The pump 118 is driven by an electric motor 123 coupled thereto. In some installations it may be possible to drive the pump 118 by connecting it to the knife motor 17. Pump 118 and pressure regulator 117 are set to deliver hydraulic fluid to the pressure reducing valve 116 at a pressure equal to the pressure of fluid normally leaving cylinder 26 through line 27.

Under usual operating conditions when the feed carriage 23 is being advanced the forces acting on the two sides of the piston in cylinder 26 are nearly balanced. Since the area of the piston on the end connected to piston rod 29 is less than the area of its free end, it is clear that the fluid pressure in the forward end of cylinder 26 (and in line 27) will be somewhat greater than the pressure in the rear end of the cylinder. In the actual machine it was found that when hydraulic fluid was introduced to the rear end of cylinder 26 at 150 p.s.i. the pressure of the fluid leaving the forward end of the cylinder was approximately 250 p.s.i. Therefore, the pump 118 and pressure regulator 117 are set to deliver hydraulic fluid at 250 p.s.i. to the pressure reducing valve 116. The fluid introduced to line 115 is also at 250 p.s.i. When the valve solenoid 103 is energized, the four-way valve 108 is moved to its second position, which blocks line 27 and places line 115 in communication with line 109, and fluid from the reducing valve 116 is directed to the flow control valve 110. Thus, fluid at 250 p.s.i. will normally continuously pass through the flow control valve regardless of the position of four-way valve 108. At the time that the four-way valve 108 is again moved to its first position, and fluid passes from the forward end of cylinder 26 through the flow control valve 110, all of the hydraulic components will contain fluid at about the normal operating pressures. Thus, there will be no tendency for the piston to surge forward at the beginning of a feed cycle.

Another fluid line 125 connects the low pressure end of the pressure reducing valve 116 to a two-way valve 126. The pressure reducer 116 directs fluid at 150 p.s.i. into this line. A manual selector handle 127 is connected to the valve 126 and provides a means for an operator to stop the feed carriage at any time. When the handle 127 is pulled outwardly the valve is placed in its first position directing hydraulic fluid from line 125 to a line 128. When the handle 127 is pushed inwardly valve 126 is placed in its second position which connects line 128 to a line 129 to the sump 112, and at the same time connects fluid line 125 to a line 130. Line 130 is connected to another fluid line 131 at the flow control valve 110 and empties into the sump 112. When the two-way valve 126 is placed in its second position, the 150 p.s.i. fluid from the pressure reducer valve 116 will be returned to the sump 112 and feed carriage 23 will stop. However, when valve 126 is placed in its first position, the fluid at 150 p.s.i. will be directed through line 128 to a reversing valve 132. This reversing valve 132 is a four-way valve having three operative position. Valve 132 is provided with both a manual control handle 133 and a hydraulic actuator 134. Reversing valve 132 is spring loaded to a first or normal position which connects fluid 128 to line 28 and the rear of cylinder 26. When both valve 126 and valve 132 are in their first positions, hydraulic fluid at 150 p.s.i. will be introduced to the rear end of cylinder 26. Assuming at this time that valve 108 is in its first position (directing fluid from the forward end of cylinder 26 through the flow control valve 110), the feed carriage 23 will be advanced when fluid at 150 p.s.i. is introduced to the rear end of the cylinder.

A fluid line 137 connects the reversing valve 132 with line 27 through a T connector 138. Reversing valve 132 is also connected to the sump 112 by a fluid line 139. Holding the control handle 133 inwardly places the reversing valve in its second position connecting line 128 to line 28 and connecting line 137 to line 139. Thus, when valve 132 is in the second position, fluid at 150 p.s.i. will be directed to the rear of cylinder 26 and an unimpeded passage is connected between the forward end of the cylinder and sump 112. This connection provides a means to quickly advance the feed carriage at any time an operator elects to do so. When the control handle 133 is held outwardly, the reversing valve 132 is placed in its third position connecting line 28 to line 139 and connecting line 137 to line 128. In this manner, hydraulic fluid at 150 p.s.i. is introduced to line 27 and the forward end of cylinder 26 while the rear end of the cylinder is connected directly to the sump 112. The effect is to quickly reverse the motion of the piston in cylinder 26 and move the feed carriage 23 away from knife 12.

Valve 132 may also be placed in the third or reversing position automatically by the hydraulic actuator 134. As may be seen in FIGURE 2, the hydraulic actuator 134 is connected to a rotary pilot valve 141 by a fluid line 142. The pilot valve 141 is in turn connected to a T connector 143 in line 128 by a fluid line 144. Thus, the pilot valve 141 may direct hydraulic fluid at 150 p.s.i. to the actuator 134 when valve 126 is in its first position. Fluid line 145 connects the pilot valve 141 to the sump 112. Since it is desirable to automatically reverse the feed carriage 23 when it reaches the end of a feed stroke, suitable mechanical linkages are provided to actuate the pilot valve 141. A rod 147 is slidably secured beneath the upper surface 11 of bed 10 and extends for a length equal to the maximum feed stroke of the carriage 23. A lug 148 is connected to the end of rod 147 near knife 12 and projects into the path of the pusher member 24. Another lug 149 is connected to the opposite end of rod 147 and also extends into the path of the pusher member 24. One end of a lever 150 is pivotally connected to the rod 147. The other end of lever 150 is pivotally connected to an actuator handle 151 of pilot valve 141. The lever 150 is pivoted about a pin 152 so that a small movement of the rod 147 will fully actuate the pilot valve 141. When the feed carriage 23 reaches the end of its forward movement, the pusher member 24 will strike lug 148 and slide rod 147 slightly forward. Lever 150 is pivoted thereby and the pilot valve is turned to direct fluid at 150 p.s.i. to the hydraulic actuator 134. The reversing valve 132 is placed in its third position, thereby, and the feed carriage 23 will be reversed. When the carriage 23 moves to its rear-most position, the pusher member 24 will strike lug 149, and slide bar 147 rearwardly to pivot lever 150 and move the pilot valve 141 to connect the hydraulic actuator 134 to line 145 and sump 112. The reversing valve 132 will spring back to its first or normal position, which directs fluid to line 28 and the rear of cylinder 26, when pressure is released in the actuator 134 and therefore the carriage will automatically move forward toward knife 12.

*Operation*

The operation of the slicing machine should be apparent from the foregoing description. The slicing knife 12 and the hydraulic pump 118 are started by connecting the motors 17 and 123 with a suitable source of electric power (not shown). Valve 126 is placed in its first position and the reversing valve is held in its third position to move the feed carriage 23 rearwardly, until the carriage reaches the end of its path. At this time, the reversing valve 132 is released (springing to its first position) and valve 126 is placed in its second position, thus stopping flow of hydraulic fluid to cylinder 26 and therefore stopping the feed carriage 23. A bacon slab is then placed upon the bed 10 between the pusher member 24 and the knife 12, and the control device generally 20, is set for the desired number of slices per draft. To do this, crank arm 44 is rotated until the locking pin 49 may be screwed down into the appropriate pin seat 50. At the same time the dial 113 on the flow control valve 110 is adjusted to regulate the proper slice thickness. Valve 126 is then returned to its first position to start the feeding operation, and the reversing valve 132 is held in its second position to quickly advance the feed carriage 23 until the pusher face 25 engages the bacon slab and advances it to the knife 12. The reversing valve 132 is then released allowing it to spring to its first or normal position for normal forward feed. At this time the slicing machine will operate automatically.

If at any time it is necessary to stop the advance of the feed carriage 23, valve 126 is placed in its second position. Or if it is desirable to reverse the carriage 23, the reversing valve 132 is held in its third position.

The cam assemblies 55 will rotate continuously while knife shaft 13 is rotating. During automatic operation when a projection on cam 58 (in the energized channel) actuates switch 69 (movable with index shaft 41) an electric circuit is completed to the valve solenoid 103. The valve solenoid is thereby energized and moves the four-way valve 108 from its first to its second position. This position of the valve 108 prevents fluid from leaving the forward end of the cylinder 26 and thus, the feed carriage will stop. At the same time, the flow control valve 110 is connected to a supply of hydraulic fluid at about 250 p.s.i. The cam assembly 55 continues to rotate, and when cam 57 actuates switch 68 the electric circuit to the valve solenoid 103 will be broken. The valve solenoid 103 is then de-energized and valve 108 will return to its first position. This re-connects the forward end of the cylinder 26 to the flow control valve 110 and fluid will pass therethrough to the sump 112. Feed carriage 23 will advance toward knife 12 until the cam 58 again actuates switch 69 and the cycle repeats.

When the feed carriage 23 advances it forces the bacon slab into the path of the blade of knife 12 to sever slices therefrom. These slices fall onto the ribbons 33 of the continuously moving take-off conveyor 32 in a shingled fashion. Interruption of the advance of feed carriage 23 does not effect the take-off conveyor 32; however, no slices will fall thereon during the interval that the carriage 23 is stopped. Thus, a space will be left on the take-off conveyor 32 between the last slice severed during one cycle and the first slice severed upon commencement of the next succeeding cycle.

This automatic operation will continue until the last of the slab is severed and the feed carriage 23 trips the lug 148. The reversing valve 132 will be automatically placed in its third position and the feed carriage 23 will be drawn rearwardly until it trips lug 149. During this period the next bacon slab is readied and when the carriage has moved to the rear a sufficient distance it is placed between the pusher face 25 and the knife 12. When lug 149 is tripped the reversing valve 132 will spring to its first position and the feed carriage will start to advance toward knife 12 under automatic control. If necessary, valve 132 may be operated to quickly advance the carriage and take up any excess space between the pusher face 25, the slab, and knife 12. The crank arm 44 of the control device 20 and the flow control valve 110 may be re-positioned for drafts of a different number of slices or slices of a different thickness at any time during the operation of the machine.

Obviously, many modifications and variations of the invention as hereinbefore set forth may be made without departing from the spirit and scope thereof, and therefore only such limitations should be imposed as are indicated in the appended claims.

We claim:

1. In a slicing machine, in combination: a rotatable slicing knife; cam means rotatable at a speed proportionate to the speed of said knife; a first sensing means adjacent said cam means and engageable thereby momentarily once each revolution of the cam means; a second sensing means adjacent said cam means and engageable thereby once each revolution of the cam means, said first and said second sensing means being adjustable about said cam means with respect to one another; a feed carriage movable toward the slicing knife; advancing means to move said carriage toward said knife; and connecting means linking said first and said second sensing means to said advancing means whereby said carriage will be moved only during the interval between the time said cam means engages said second sensing means and the time said cam means engages said first sensing means.

2. In a slicing machine, in combination; a rotatable slicing knife; a feed carriage disposed for moving material to be sliced toward said knife; advancing means connected to advance said feed carriage toward said knife; slice removing means positioned adjacent said knife opposite said feed carriage for receiving slices of material severed by said knife; drive means connected for rotating said knife at a constant speed; cam means positioned to be rotated by said drive means at a speed proportionate to the speed of said knife; a first sensing means adjacent said cam means engageable thereby momentarily once each revolution of the cam means and connected to stop said advancing means, a second sensing means adjacent said cam means engageable thereby once each revolution of the cam means and connected to start said advancing means, said first and said second sensing means being adjustable about said cam means with respect to one another whereby slices will be severed from the material only during the interval between engagement of said second and said first sensing means by said cam means and the slices will be removed by said slice removing means a distance sufficient to define a group during the interval between the engagement of said first and said second sensing means by said cam means.

3. In a slicing machine having a slicing knife adapted to slice material advanced by a feed carriage and an advancing means for moving the feed carriage, the improvement for controlling the advancing means, said improvement comprising: a frame; an index plate fastened to one end of said frame; a shaft rotatably secured within said frame and extending through said plate; handle means secured to said shaft adjacent the face of said plate for selecting a position of said shaft; cam means freely rotatable about said shaft; a first sensing means fixed to said shaft adjacent said cam means engageable thereby once each revolution of said cam means and connected to stop the advancing means; a second sensing means fixed to said frame adjacent said cam means engageable thereby once each revolution of said cam means and connected to start the advancing means; and means to cause said cam means to rotate whereby the feed carriage will be advanced toward the knife for a portion of one revolution of said cam means and will stop for the remainder of the revolution of said cam means according to the position of said shaft.

4. A slicing machine comprising, in combination: a bed for supporting a material to be sliced; a rotating knife at one end of the bed; a feed carriage mounted to move along the bed for advancing the material toward said knife; hydraulic means connected to the feed carriage for advancing said carriage at a rate dependent upon the rate of hydraulic fluid leaving said means; a flow regulator connected to the hydraulic means for controlling the rate of fluid leaving said means; a valve connected between the hydraulic means and the flow regulator for fully interrupting the flow of fluid from said means; a solenoid connected to close said valve only when energized; a rotatable member associated with the knife to make one complete rotation for a certain number of revolutions of said knife; a first switch adjacent said member operable to energize the solenoid; a second switch adjacent said member operable to de-energize the solenoid, said first and said second switches being adjustable with respect to each other; and means on the rotatable member to operate said first switch and said second switch once per rotation of said member.

5. The apparatus of claim 4 including a source of hydraulic fluid at a pressure equal to the pressure of fluid normally flowing through the flow regulator connectable to said regulator by said valve when the valve is closed.

6. In a slicing machine having a slicing knife and a feed carriage movable toward the knife, the improvement for advancing the feed carriage, said improvement comprising: power means connected to move feed carriage toward the knife, a member rotatable at a speed proportionate to the speed of the knife; a first sensing means adjacent to said member and engageable thereby momentarily once each revolution of said member; said first sensing means being operatively connected to said power means to arrest the movement of the feed carriage; and a second sensing means adjacent said member and engageable thereby once each revolution of said member, said second sensing means operatively connected to said power means to initiate movement of the feed carriage toward the knife whereby the feed carriage will be advanced during the interval between the time said member engages a second sensing means and the time said member engages said first sensing means.

7. In a slicing machine, in combination: a rotatable slicing knife; a feed carriage moveable toward the slicing knife; advancing means to move said carriage toward said knife; cam means rotatable at a speed proportionate to the speed of said knife; a first sensing means adjacent said cam means and engageable thereby momentarily once each revolution of the cam means; and a second sensing means adjacent said cam means and engageable thereby once each revolution of the cam means, said first and said second sensing means being adjustable about said cam means with respect to one another, one of said sensing means being connected to stop the advancing means and the other sensing means being connected to start the advancing means.

8. In a slicing machine having a slicing knife adapted to slice material advanced by a feed carriage and an advancing means for moving the feed carriage, the improvement for controlling the advancing means, said improvement comprising: a frame; an index plate fastened to one end of said frame; a shaft rotatably secured within said frame and extending to said plate; handle means secured to said shaft adjacent the face of said plate for selecting a position of said shaft; cam means freely rotatable about said shaft; a first sensing means fixed to said shaft adjacent said cam means engageable thereby once each revolution of said cam means; a second sensing means fixed to said frame adjacent said cam means engageable thereby once each revolution of said cam means, one of said sensing means being connected to stop the advancing means and the other sensing means being connected to start the advancing means; and means to cause said cam means to rotate whereby the feed carriage will be advanced toward the knife for a portion of one revolution of said cam means and will stop for the remainder of the revolution of said cam means according to the position of said shaft.

References Cited in the file of this patent

UNITED STATES PATENTS

| | | |
|---|---|---|
| 2,255,048 | Ewald | Sept. 9, 1941 |
| 2,272,684 | Vickers | Feb. 10, 1942 |
| 2,365,748 | Curtis | Dec. 26, 1944 |
| 2,426,835 | Mahler | Sept. 2, 1947 |
| 2,744,553 | Folk | May 8, 1956 |
| 2,768,666 | Garapolo et al. | Oct. 30, 1956 |
| 2,811,997 | Schmidt | Nov. 5, 1957 |
| 2,812,792 | Allbright | Nov. 12, 1957 |
| 2,870,810 | Folk | Jan. 27, 1959 |

UNITED STATES PATENT OFFICE
CERTIFICATE OF CORRECTION

Patent No. 3,015,350　　　　　　　　　　　　　　January 2, 1962

Howard G. Reichel et al.

It is hereby certified that error appears in the above numbered patent requiring correction and that the said Letters Patent should read as corrected below.

Column 5, line 68, before "$N_1$" insert -- 80 --; column 6, line 72, strike out "up"; column 7, line 25, for "$D_1$" read -- $D^1$ --; column 11, line 50, strike out "ad-".

Signed and sealed this 1st day of May 1962.

(SEAL)
Attest:

ERNEST W. SWIDER
Attesting Officer

DAVID L. LADD
Commissioner of Patents